US012400333B2

(12) United States Patent
Tang et al.

(10) Patent No.: US 12,400,333 B2
(45) Date of Patent: Aug. 26, 2025

(54) METHOD, DEVICE, COMPUTER SYSTEM FOR DETECTING PEDESTRIAN BASED ON 3D POINT CLOUDS

(71) Applicant: SOUTH CHINA NORMAL UNIVERSITY, Guangzhou (CN)

(72) Inventors: Xiaoyu Tang, Guangzhou (CN); Qunyuan Chen, Guangzhou (CN)

(73) Assignee: SOUTH CHINA NORMAL UNIVERSITY SCHOOL OF PHYSICS & TELECOMMUNICATION ENGINEERING, Guangzhou (CN)

( * ) Notice: Subject to any disclaimer, the term of this patent is extended or adjusted under 35 U.S.C. 154(b) by 161 days.

(21) Appl. No.: 18/496,532

(22) Filed: Oct. 27, 2023

(65) Prior Publication Data

US 2024/0193788 A1    Jun. 13, 2024

(30) Foreign Application Priority Data

Dec. 13, 2022  (CN) .......................... 202211593474.2

(51) Int. Cl.
*G06T 7/162*    (2017.01)

(52) U.S. Cl.
CPC .... *G06T 7/162* (2017.01); *G06T 2207/10028* (2013.01); *G06T 2207/20021* (2013.01);
(Continued)

(58) Field of Classification Search
CPC .......... G06T 7/162; G06T 2207/10028; G06T 2207/20021; G06T 2207/20076;
(Continued)

(56) References Cited

U.S. PATENT DOCUMENTS 11,735,315 B2 *  8/2023  Wu ........................ G06V 10/82
                                                              382/190
12,079,970 B2 *  9/2024  Cheng ...................... G06T 5/60
(Continued)

FOREIGN PATENT DOCUMENTS

| CN | 103955920 B | 4/2017 |
|---|---|---|
| CN | 111199206 A | 5/2020 |
| CN | 114879160 B | 10/2022 |

*Primary Examiner* — Kenneth B Lee, Jr.
(74) *Attorney, Agent, or Firm* — INNOVATION CAPITAL LAW GROUP, LLP; Vic Lin

(57) ABSTRACT

Disclosed are a method, device, computer system for detecting pedestrians based on 3D point clouds. The method includes: obtaining the spatial radar point cloud data of area to be detected; dividing the spatial radar point cloud data to obtain a plurality of 3D voxel grid cells according to a preset unit of voxel; encoding the plurality of 3D voxel grid cells and obtaining the voxel encoded data of the plurality of radar point cloud data; obtaining a first feature map and a second feature map based on a predetermined sparse convolutional backbone network and self-attention transformation network; and performing fusing processing for a fused feature map to input into a predetermined pedestrian detection model for pedestrian detection to obtain the pedestrian detection information of the area to be detected. The present disclosure enables more comprehensive pedestrian detection in the area to be detected with improved accuracy.

15 Claims, 9 Drawing Sheets

(52) U.S. Cl.
CPC ............... *G06T 2207/20076* (2013.01); *G06T 2207/20084* (2013.01); *G06T 2207/20221* (2013.01); *G06T 2207/30196* (2013.01); *G06T 2207/30261* (2013.01)

(58) Field of Classification Search
CPC . G06T 2207/20084; G06T 2207/30196; G06T 2207/30261
See application file for complete search history.

(56) References Cited

U.S. PATENT DOCUMENTS

| | | | |
|---|---|---|---|
| 2022/0207868 A1* | 6/2022 | Zhang | G01S 7/417 |
| 2023/0063476 A1* | 3/2023 | Meyer | G01S 7/417 |
| 2023/0105331 A1* | 4/2023 | Cheng | G06F 18/24 |
| | | | 345/419 |

* cited by examiner

METHOD, DEVICE, COMPUTER SYSTEM FOR DETECTING PEDESTRIAN BASED ON 3D POINT CLOUDS

CROSS-REFERENCE TO RELATED APPLICATIONS

This application claims priority to Chinese Application No. CN 202211593474.2 having a filing date of Dec. 13, 2022, the entire contents of which are hereby incorporated by reference.

FIELD OF TECHNOLOGY

The following relates to the technical field of pedestrian detection, in particular to a method, device, computer system for detecting pedestrian based on 3D point clouds.

BACKGROUND

Three-dimensional (3D) object detection, which is an important task in self-driving, typically utilizes data from sensors such as lidar and cameras to estimate 3D target boxes with orientation for objects in 3D space, and predict specific categories for each 3D target box. With the further development of self-driving techniques and deep learning techniques, lidar has become a major technical means for self-driving to perceive the environment. A crucial premise of self-driving is to ensure the safety of people, but existing detection algorithms are more focused on the detection of vehicles on the road, and the detection of pedestrians needs to be improved.

Object detection methods based on voxelized point clouds divide 3D voxels in 3D space with a certain resolution, and each non-empty voxel contains a variable number of point clouds, so that the storage of point clouds in the whole 3D space becomes regular and can be processed with 3D convolution. VoxelNet and SECOND are two representative methods based on voxelization, which voxelize point clouds and then extract point cloud features through 3D convolution, then convert the features into BEV features, and further extract features through 2D convolution while carry out downsampling at the same time. Most algorithms today use the similar process above. However, for point clouds collected by lidar, the volume proportion of 3D space occupied by objects (vehicles, bicycles, pedestrians) is much smaller than the area proportion occupied by targets in 2D images. Directly applying the conventional 2D detection process to 3D detection may not work for small objects. Objects such as pedestrians are prone to lose features in the process of down sampling, which is difficult to recover in the subsequent detection process, resulting in missed detection.

SUMMARY

To overcome the problems existing in related technologies, embodiments of the present disclosure provide a method, device, computer system for detecting pedestrians based on 3D point clouds.

According to a first aspect of an embodiment of the present disclosure, a method for detecting pedestrian based on 3D point clouds is provided, which includes the following steps:

obtaining spatial radar point cloud data of area to be detected with a sensor, wherein the spatial radar point cloud data includes a plurality of radar point cloud data;

performing following steps with a processor:

dividing the spatial radar point cloud data to obtain a plurality of 3D voxel grid cells according to a preset unit of voxel, wherein the plurality of 3D voxel grid cells comprises a plurality of radar point cloud data;

encoding the plurality of 3D voxel grid cells and obtaining voxel encoded data of the plurality of radar point cloud data corresponding to the plurality of 3D voxel grid cells;

inputting the voxel encoded data of the plurality of radar point cloud data corresponding to the plurality of 3D voxel grid cells into a predetermined sparse convolutional backbone network for feature extraction to obtain a first feature map;

dividing the plurality of 3D voxel grid cells respectively according to a predetermined window to obtain a plurality of 3D sub-voxel grid cells corresponding to the plurality of 3D voxel grid cells and obtaining voxel encoded data of the plurality of radar point cloud data corresponding to the plurality of 3D sub-voxel grid cells;

obtaining a second feature map according to the voxel encoded data of the plurality of radar point cloud data corresponding to the plurality of 3D sub-voxel grid cells and a predetermined second feature extraction algorithm, wherein the second feature extraction algorithm is:

$$F_2 = W_2(\text{LN}(\text{MSA}(\text{LN}(F_1), \text{PE}(I)) + F_1)) + b_2 + \text{MSA}(\text{LN}(F_1), \text{PE}(I)) + F_1,$$

wherein $F_1$ represents the voxel encoded data, $F_2$ represents the second feature map, MSA(□) represents a multi-headed self-attention function, LN(□) represents a layer normalization function, PE(□) represents a position encoding function, $W_2$ represents a second trainable weight parameter, $b_2$ represents a second bias parameter, and I represents coordinate data of the radar point cloud data corresponding to the plurality of 3D sub-voxel grid cells on the first feature map;

and fusing the first feature map and the second feature map to obtain a fused feature map, and inputting the fused feature map into a predetermined pedestrian detection model for pedestrian detection to obtain the pedestrian detection information for the area to be detected.

In an alternative embodiment, wherein the step of encoding the plurality of 3D voxel grid cells and obtaining the voxel encoded data of the plurality of radar point cloud data corresponding to the plurality of 3D voxel grid cells comprises:

obtaining coordinate data and reflectivity data of the plurality of radar point cloud data corresponding to the plurality of 3D voxel grid cells, wherein the coordinate data comprise original coordinate data, average coordinate difference data, and central coordinate difference data;

splicing the coordinate data and reflectivity data of the plurality of radar point cloud data corresponding to the plurality of 3D voxel grid cells, to obtain voxel spliced data of the plurality of radar point cloud data corresponding to the plurality of 3D voxel grid cells thereof; and processing the voxel spliced data of the plurality of radar point cloud data corresponding to the plurality of 3D voxel grid cells, to obtain the voxel encoded data thereof according to a predetermined encoding algorithm, wherein the predetermined encoding algorithm is:

$$F_1 = W_1(W_0 F_p + b_0) + b_1,$$

wherein, $F_1$ represents the voxel encoded data, $W_0$ represents a first trainable weight parameter, $W_1$ represents a second trainable weight parameter, $F_p$ represents the voxel spliced data, $b_0$ represents a first bias parameter, and $b_1$ represents a second bias parameter.

In an alternative embodiment, wherein the step of obtaining coordinate data and reflectivity data of the plurality of radar point cloud data corresponding to the plurality of 3D voxel grid cells comprises:
  obtaining the average coordinate data of the plurality of 3D voxel grid cells, according to predetermined average coordinate algorithms and the original coordinate data of the plurality of radar point cloud data corresponding to the plurality of 3D voxel grid cells, wherein the predetermined average coordinate algorithms are:

$$\overline{x} = \sum_{i=0}^{k} x_i, \ \overline{y} = \sum_{i=0}^{k} y_i, \ \overline{z} = \sum_{i=0}^{k} z_i,$$

wherein, k represents any of x, y, z coordinate axes, i represents the i-th radar point cloud data in the 3D voxel grid cell, $x_i$ represents the original coordinate data of the i-th radar point cloud data on the x coordinate axis, $\overline{x}$ represents the average coordinate data on the x coordinate axis, $y_i$ represents the original coordinate data of the i-th radar point cloud data on the y coordinate axis, $\overline{y}$ represents the average coordinate data on the y coordinate axis, $z_i$ represents the original coordinate data of the i-th radar point cloud data on the z coordinate axis, $\overline{z}$ represents the average coordinate data on the z coordinate axis;
  obtaining the original coordinate data, length data and initial offset data of the plurality of 3D voxel grid cells and then obtaining central coordinate data thereof according to a predetermined central coordinate algorithm, wherein the predetermined central coordinate algorithm is:

$$\overline{v}_k = coord_k * v_k + offset_k,$$

wherein, $\overline{v}_k$ represents the central coordinate data of the 3D voxel grid cell on the k-th coordinate axis, $coord_k$ represents the original coordinate data of the 3D voxel grid cell on the k-th coordinate axis, $v_k$ represents the length data of the 3D voxel grid cell on the k-th coordinate axis, $offset_k$ represents the initial offset data of the 3D voxel grid cell on the k-th coordinate axis;
  and obtaining average coordinate difference data and the central coordinate difference data of the plurality of radar point cloud data corresponding to the plurality of 3D voxel grid cells, according to the original coordinate data of the plurality of radar point cloud data corresponding to the plurality of 3D voxel grid cells, the average coordinate data and the central coordinate data of the plurality of 3D voxel grid cells.

In an alternative embodiment, wherein the step of obtaining coordinate data and reflectivity data of the plurality of radar point cloud data corresponding to the plurality of 3D voxel grid cells comprises:
  obtaining the average coordinate data of the plurality of 3D voxel grid cells, according to predetermined average coordinate algorithms and the original coordinate data of the plurality of radar point cloud data corresponding to the plurality of 3D voxel grid cells, wherein the predetermined average coordinate algorithms are:

$$\overline{x} = \sum_{i=0}^{k} x_i, \ \overline{y} = \sum_{i=0}^{k} y_i, \ \overline{z} = \sum_{i=0}^{k} z_i,$$

wherein, k represents any of x, y, z coordinate axes, i represents the i-th radar point cloud data in the 3D voxel grid cell, $x_i$ represents the original coordinate data of the i-th radar point cloud data on the $\overline{x}$ coordinate axis, x represents the average coordinate data on the x coordinate axis, $y_i$ represents the original coordinate data of the i-th radar point cloud data on the $\overline{y}$ coordinate axis, y represents the average coordinate data on the y coordinate axis, $z_i$ represents the original coordinate data of the i-th radar point cloud data on the z coordinate axis, $\overline{z}$ represents the average coordinate data on the z coordinate axis;
  obtaining the original coordinate data, length data and initial offset data of the plurality of 3D voxel grid cells and then obtaining central coordinate data thereof according to a predetermined central coordinate algorithm, wherein the predetermined central coordinate algorithm is:

$$F_1 = W_1(W_0 F_p + b_0) + b_1,$$

wherein, $F_1$ represents the voxel encoded data, $W_0$ represents a first trainable weight parameter, $W_1$ represents a second trainable weight parameter, $F_p$ represents the voxel spliced data, $b_0$ represents a first bias parameter, and $b_1$ represents a second bias parameter.

In an alternative embodiment, wherein the step of inputting the fused feature map into a predetermined pedestrian detection model for pedestrian detection to obtain the pedestrian detection information for the area to be detected comprises:
  dividing the fused feature map into a plurality of sub-feature regions, setting a plurality of detection frames in the plurality of sub-feature regions, and obtaining original position data of the plurality of detection frames corresponding to the plurality of sub-feature regions;
  and performing classification detection to the plurality of detection frames corresponding to the plurality of sub-feature regions, obtaining classification types of the plurality of detection frames, performing regression prediction of the plurality of detection frames, obtaining position deviation data of the plurality of detection frames, and obtaining position correction data of the plurality of detection frames according to the original position data and the position deviation data thereof, wherein the classification types of the plurality of detection frames and the position correction data thereof are used as pedestrian detection information for the area to be detected.

In an alternative embodiment, wherein the step of performing classification detection to the plurality of detection frames corresponding to the plurality of sub-feature regions to obtain classification types comprises:
  obtaining a predicted classification probability vector for the plurality of detection frames corresponding to the plurality of sub-feature regions according to a predetermined predicted classification probability vector calculation algorithm with the plurality of detection frames as input parameters, wherein the predetermined predicted classification probability vector calculation algorithm is $Y = \mathrm{sigmoid}(W_3 X + b_3),$ wherein, Y represents the predicted classification probability vector, X represents the input parameters, sigmoid( ) represents an activation function, $W_3$ represents a third trainable weight parameter, and $b_3$ represents a third bias parameter;

and filtering the plurality of detection frames based on predicted classification probability vectors of the plurality of detection frames and a predetermined confidence threshold, obtaining a plurality of target detection frames corresponding to the plurality of sub-feature regions, and based on the predicted classification probability vectors of the plurality of target detection frames, obtaining a classification type corresponding to the highest probability, as the classification type of the plurality of target detection frames.

According to a second aspect of an embodiment of the present disclosure, a device for detecting pedestrian based on 3D point clouds is provided, which includes:

a sensor configured to obtain spatial radar point cloud data of area to be detected, wherein the spatial radar point cloud data includes a plurality of radar point cloud data;

a processor, and a plurality of modules executed by the processor, the plurality of modules comprising:

a voxel partitioning module, configured to divide the spatial radar point cloud data to obtain a plurality of 3D voxel grid cells according to a preset unit of voxel, wherein the plurality of 3D voxel grid cells comprises a plurality of radar point cloud data;

a voxel encoding module, configured to encode the plurality of 3D voxel grid cells and obtain the voxel encoded data of the plurality of radar point cloud data corresponding to the plurality of 3D voxel grid cells;

a sparse convolutional backbone network module, configured to input the voxel encoded data of the plurality of radar point cloud data corresponding to the plurality of 3D voxel grid cells into a predetermined sparse convolutional backbone network for feature extraction to obtain a first feature map;

a self-attention transformation network module, configured to divide the plurality of 3D voxel grid cells respectively according to a predetermined window to obtain a plurality of 3D sub-voxel grid cells corresponding to the plurality of 3D voxel grid cells and to obtain voxel encoded data of the plurality of radar point cloud data corresponding to the plurality of 3D sub-voxel grid cells; and to obtain a second feature map according to the voxel encoded data of the plurality of radar point cloud data corresponding to the plurality of 3D sub-voxel grid cells and a predetermined second feature extraction algorithm, wherein the second feature extraction algorithm is:

$F_2 = W_2(\mathrm{LN}(\mathrm{MSA}(\mathrm{LN}(F_1), \mathrm{PE}(I)) + F_i)) + b_2 + \mathrm{MSA}(\mathrm{LN}(F_1), \mathrm{PE}(I)) + F_1,$ wherein $F_1$ represents the voxel encoded data, $F_2$ represents the second feature map, MSA(□) represents a multi-headed self-attention function, LN(□) represents a layer normalization function, PE(□) represents a position encoding function, $W_2$ represents a second trainable weight parameter, $b_2$ represents a second bias parameter, and I represents coordinate data of the radar point cloud data corresponding to the plurality of 3D sub-voxel grid cells on the first feature map;

a pedestrian detection module, configured to fuse the first feature map and the second feature map to obtain a fused feature map, and to input the fused feature map into a predetermined pedestrian detection model for pedestrian detection to obtain the pedestrian detection information for the area to be detected.

According to a third aspect of an embodiment of the present disclosure, a computer system for detecting pedestrian based on 3D point clouds is provided, which includes: a processor; a memory; and a computer program stored in the memory and executable by the processor, wherein the processor executes the computer program to implement the steps of the method for detecting pedestrian based on 3D point clouds.

Embodiments of the present application provide a method, device, system and storage medium for detecting pedestrians based on 3D point clouds, which utilizes sparse convolutional backbone network and self-attention transform network to obtain feature data maps of different perceptual fields and maintain the sparsity of features and the resolution of feature maps in feature extraction, so that the features of small objects such as pedestrians can be better retained in feature extraction and processed for fused feature to detect pedestrians, achieving more comprehensive pedestrian detection in the area to be detected with improved accuracy.

It should be understood that the above general description and the subsequent detailed description are only illustrative and explanatory but not limiting to the present disclosure.

For a better understanding and implementation, the disclosure will be described in detail below in combination with the accompanying drawings.

DETAILED DESCRIPTION

Exemplary embodiments will be described in detail herein, examples of which are illustrated in the accompanying figures. Where the following description refers to the drawings, the same numerals in different figures refer to the same or similar elements unless otherwise indicated. The implementations described in the exemplary embodiments below are not intended to represent all implementations consistent with the disclosure. Rather, they are merely examples of apparatus and methods consistent with some aspects of the application as recited in the appended claims.

The terminology used herein is for the purpose of describing particular embodiments only and is not intended to be limiting of the present disclosure. As used herein, the singular forms "a," "an," and "the" are intended to include the plural forms as well as the singular forms, unless the context clearly indicates otherwise. It will be further understood, the term "and/or" includes any and all combinations of one or more of the associated listed items.

Figure 1:
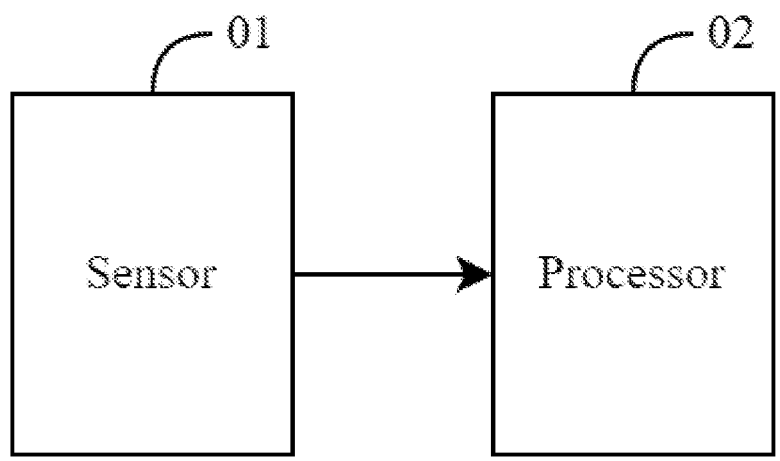
FIG. 1 is a schematic hardware diagram of a device for detecting pedestrian based on 3D point clouds.

Referring to FIG. 1, which is a schematic hardware diagram of a device for detecting pedestrian based on 3D point clouds.

The device for detecting pedestrian based on 3D point clouds provided by an embodiment of the present application includes:

A sensor 01, configured to obtain spatial radar point cloud data of area to be detected.

A processor 02, configured to execute a method for detecting pedestrian based on 3D point clouds according to the spatial radar point cloud data obtained by the sensor.

In an embodiment, the sensor is a lidar. The lidar utilizes the principle of laser ranging to record the 3D coordinates (x,y,z), reflectivity and other information of the surface of an object scanned in 3D space for construction. The spatial radar point cloud data includes a plurality of radar point cloud data, which is the data recorded in the form of points. Each point contains 3-D coordinates which may be indicative of a moving object (e.g., pedestrian, vehicle, etc.) in the area to be detected.

Figure 2:
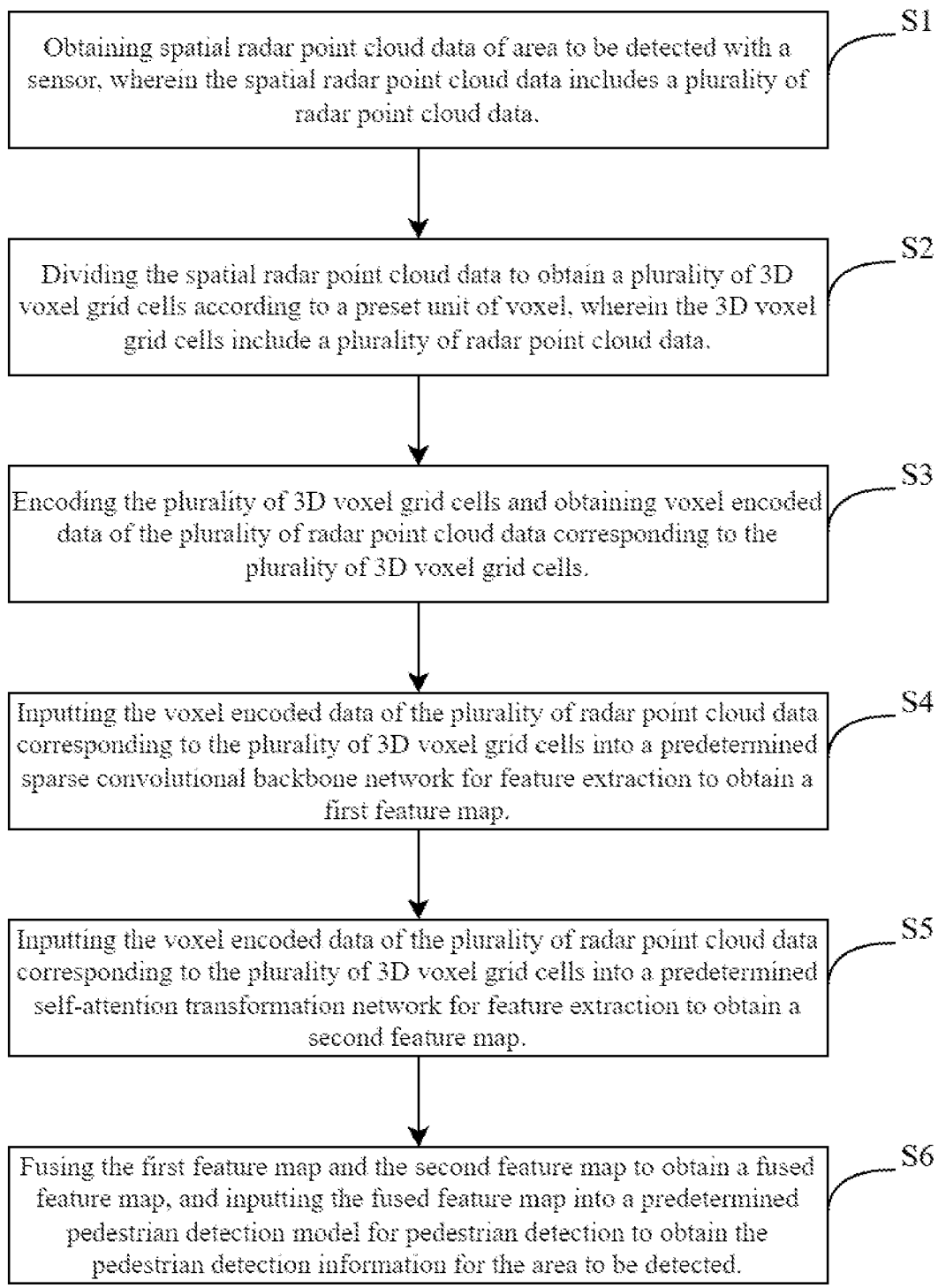
FIG. 2 is a schematic flow diagram of a method for detecting pedestrian based on 3D point clouds according to an embodiment of the present application.

Referring to FIG. 2, which is a schematic flow diagram of the method for detecting pedestrian based on 3D point clouds executed by the processor 02. The method for detecting pedestrian based on 3D point clouds provided by an embodiment of the present application, including the steps of:

S1: obtaining spatial radar point cloud data of area to be detected with the sensor 01, wherein the spatial radar point cloud data includes a plurality of radar point cloud data.

In this embodiment, the processor can utilize sensors such as lidar, camera, etc., to carry out spatial detection of the area to be detected and obtain the spatial radar point cloud data of the area to be detected.

S2: dividing the spatial radar point cloud data to obtain a plurality of 3D voxel grid cells according to a preset unit of voxel.

In this embodiment, the processor performs voxel partition of the spatial radar point cloud data according to a preset unit of voxel to obtain a plurality of 3D voxel grid cells, wherein the 3D voxel grid cells include a plurality of radar point cloud data.

Specifically, the spatial radar point cloud data contains 3D spatial information. In this embodiment, the processor uses the unit of voxel of (w, h, d) to separate the spatial radar point cloud data into equal rectangular blocks to obtain a plurality of 3D voxel grid cells, so that the radar point cloud data from the spatial radar point cloud is partitioned into the corresponding 3D voxel grid cells, wherein w is length, h is width, d is depth. The 3D voxel grid cells include a plurality of radar point cloud data.

The processor classifies the 3D voxel grid cell containing more than T radar point cloud data as a non-empty 3D voxel grid cell, otherwise it is an empty 3D voxel grid cell.

S3: encoding the plurality of 3D voxel grid cells and obtaining voxel encoded data of the plurality of radar point cloud data corresponding to the plurality of 3D voxel grid cells.

In this embodiment, the processor performs encoding of the plurality of 3D voxel grid cells to obtain the voxel encoded data of the plurality of radar point cloud data corresponding to the plurality of 3D voxel grid cells.

Figure 3:
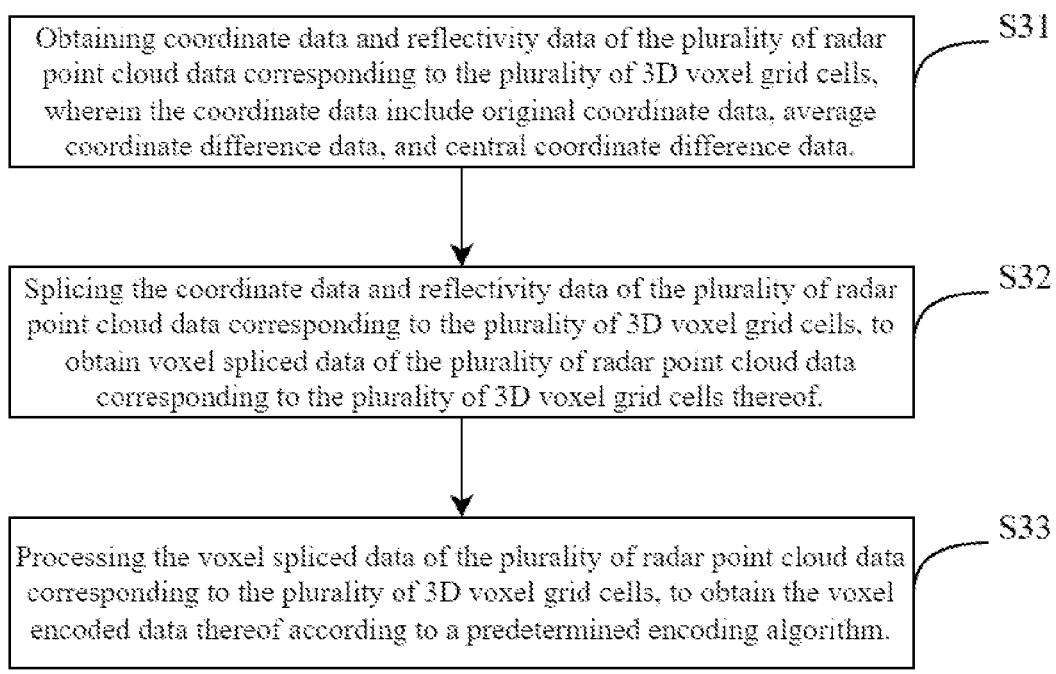
FIG. 3 is a schematic flow diagram of S3 in the method for detecting pedestrian based on 3D point clouds according to an embodiment of the present application.

Referring to FIG. 3, which is a schematic flow diagram of S3 in the method for detecting pedestrian based on 3D point clouds provided by an embodiment of the present application. The step of S3 comprises steps of S31~S33, specifically as follows:

S31: obtaining coordinate data and reflectivity data of the plurality of radar point cloud data corresponding to the plurality of 3D voxel grid cells.

In this embodiment, the processor obtains the coordinate data and reflectivity data of the plurality of radar point cloud data corresponding to the plurality of 3D voxel grid cells from the spatial radar point cloud data, wherein the coordinate data include original coordinate data, average coordinate difference data, and central coordinate difference data.

S32: splicing the coordinate data and reflectivity data of the plurality of radar point cloud data corresponding to the plurality of 3D voxel grid cells, to obtain voxel spliced data of the plurality of radar point cloud data corresponding to the plurality of 3D voxel grid cells thereof.

In this embodiment, the processor performs splicing of the coordinate data and reflectivity data of the plurality of radar point cloud data corresponding to the plurality of 3D voxel grid cells to obtain the voxel spliced data thereof.

S33: processing the voxel spliced data of the plurality of radar point cloud data corresponding to the plurality of 3D voxel grid cells, to obtain the voxel encoded data thereof according to a predetermined encoding algorithm, wherein the predetermined encoding algorithm is:

$$F_1 = W_1(W_0 F_p + b_0) + b_1,$$

wherein, $F_1$ represents the voxel encoded data, $W_0$ represents a first trainable weight parameter, $W_1$ represents a second trainable weight parameter, $F_p$ represents the voxel spliced data, $b_0$ represents a first bias parameter, and $b_1$ represents a second bias parameter.

In this embodiment, according to the predetermined encoding algorithm, the processor processes the voxel spliced data of the plurality of radar point cloud data corresponding to the plurality of 3D voxel grid cells to obtain the voxel encoded data thereof.

Figure 4:
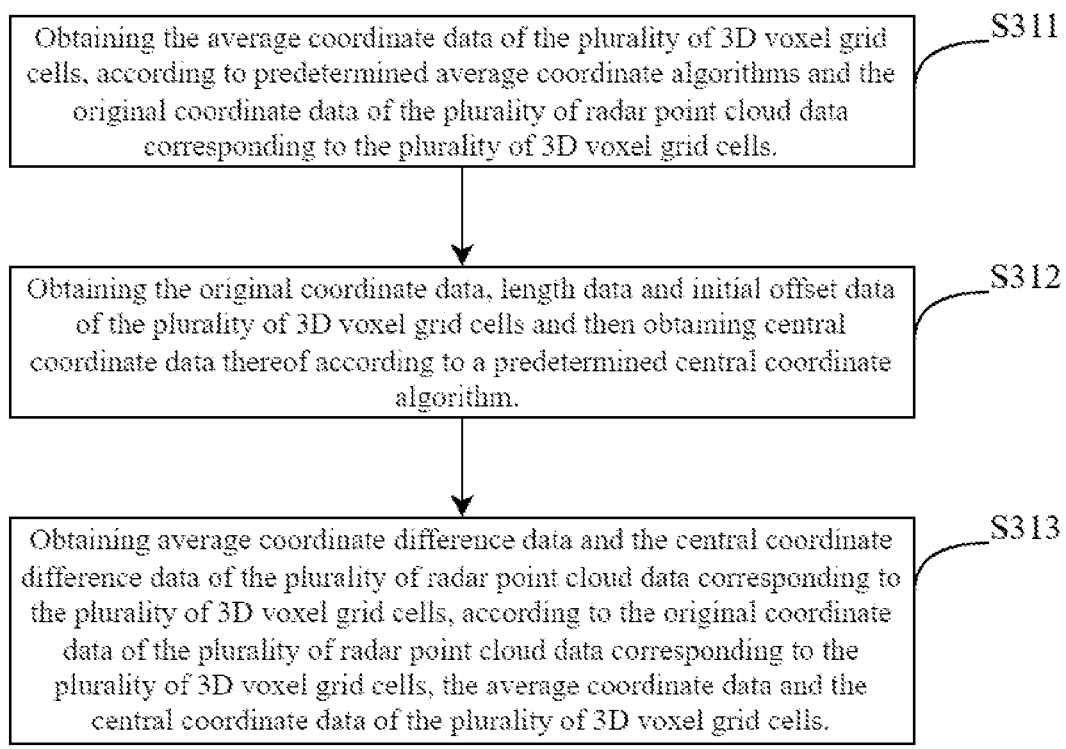
FIG. 4 is a schematic flow diagram of S31 in the method for detecting pedestrian based on 3D point clouds according to an embodiment of the present application.

Referring to FIG. 4, which is a schematic flow diagram of the method for detecting pedestrian based on 3D point clouds provided by an embodiment of the present application. The step of S31 comprises steps of S311~S313, specifically as follows:

obtaining the average coordinate data of the plurality of 3D voxel grid cells, according to predetermined average coordinate algorithms and the original coordinate data of the plurality of radar point cloud data corresponding to the plurality of 3D voxel grid cells, wherein the predetermined average coordinate algorithms are:

$$\bar{x} = \sum_{i=0}^{k} x_i, \ \bar{y} = \sum_{i=0}^{k} y_i, \ \bar{z} = \sum_{i=0}^{k} z_i,$$

wherein, k represents any of x, y, z coordinate axes, i represents the i-th radar point cloud data in the 3D voxel grid cell, $x_i$ represents the original coordinate data of the i-th radar point cloud data on the x coordinate axis, $\bar{x}$ represents the average coordinate data on the x coordinate axis, $y_i$ represents the original coordinate data of the i-th radar point cloud data on the y coordinate axis, $\bar{y}$ represents the average coordinate data on the y coordinate axis, $z_i$ represents the original coordinate data of the i-th radar point cloud data on the z coordinate axis, $\bar{z}$ represents the average coordinate data on the z coordinate axis.

In this embodiment, based on the original coordinate data of the plurality of radar point cloud data corresponding to the plurality of 3D voxel grid cells, the processor obtains the average coordinate data of the plurality of 3D voxel grid cells according to the predetermined average coordinate algorithms.

S312: obtaining the original coordinate data, length data and initial offset data of the plurality of 3D voxel grid cells and then obtaining central coordinate data thereof according to a predetermined central coordinate algorithm, wherein the predetermined central coordinate algorithm is:

$$\bar{v}_k = coord_k * v_k + offset_k,$$

wherein, $\bar{v}_k$ represents the central coordinate data of the 3D voxel grid cell on the k-th coordinate axis, $coord_k$ represents the original coordinate data of the 3D voxel grid cell on the k-th coordinate axis, $v_k$ represents the length data of the 3D voxel grid cell on the k-th coordinate axis, $offset_k$ represents the initial offset data of the 3D voxel grid cell on the k-th coordinate axis.

In this embodiment, the processor obtains the original coordinate data, length data and initial offset data of the plurality of 3D voxel grid cells, and then, according to the predetermined central coordinate algorithm, obtains the central coordinate data of the plurality of 3D voxel grid cells.

S313: obtaining average coordinate difference data and the central coordinate difference data of the plurality of radar point cloud data corresponding to the plurality of 3D voxel grid cells, according to the original coordinate data of the plurality of radar point cloud data corresponding to the plurality of 3D voxel grid cells, the average coordinate data and the central coordinate data of the plurality of 3D voxel grid cells.

S4: inputting the voxel encoded data of the plurality of radar point cloud data corresponding to the plurality of 3D voxel grid cells into a predetermined sparse convolutional backbone network for feature extraction to obtain a first feature map.

In this embodiment, the processor inputs the voxel encoded data of the plurality of radar point cloud data corresponding to the plurality of 3D voxel grid cells into a predetermined sparse convolutional backbone network for feature extraction, and obtains a first feature map.

Wherein the sparse convolutional backbone network is stacked by a plurality of submanifold sparse convolutional operators based on the sparse structure of the radar point cloud data. Specifically, the processor inputs the voxel encoded data of the plurality of radar point cloud data corresponding to the plurality of 3D voxel grid cells into the predetermined sparse convolutional backbone network, performs several times of sparse convolutional processing, and only when the center of the convolutional kernel covers the non-empty voxel grid cells, performs the feature extraction and calculates the output to obtain the first feature map, thus keeping the resolution of the first feature map unchanged while maintaining the sparsity of the first feature map to improve the accuracy and efficiency of pedestrian detection.

S5: inputting the voxel encoded data of the plurality of radar point cloud data corresponding to the plurality of 3D voxel grid cells into a predetermined self-attention transformation network for feature extraction to obtain a second feature map.

In this embodiment, the processor inputs the voxel encoded data of the plurality of radar point cloud data corresponding to the plurality of 3D voxel grid cells into a predetermined self-attention transformation network for feature extraction, and obtains a second feature map. The second feature map is obtained by performing self-attention calculation on the voxel encoded data, which not only expands the perceptual field of the data, but also keeps the resolution of the second feature map unchanged and preserves more detailed information in order to improve the accuracy as well as efficiency of pedestrian detection.

Figure 5:
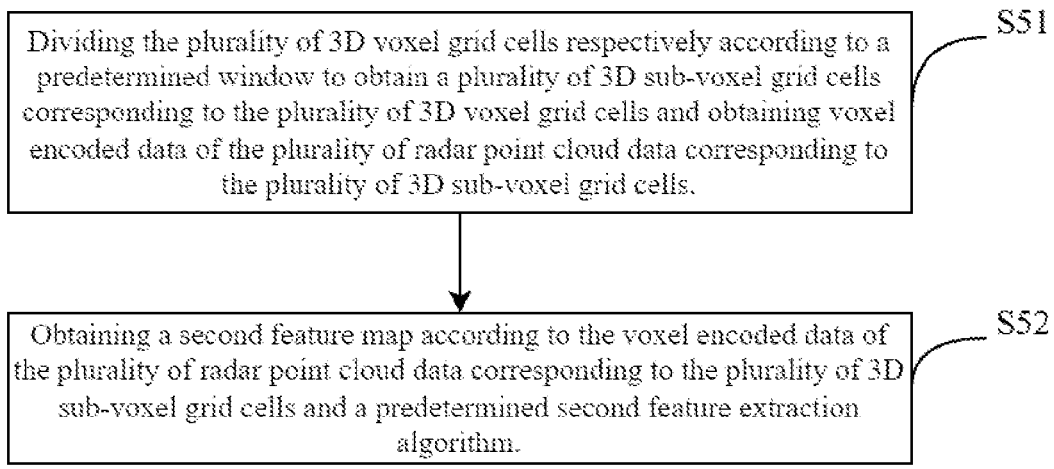
FIG. 5 is a schematic flow diagram of S4 in the method for detecting pedestrian based on 3D point clouds according to an embodiment of the present application.

Referring to FIG. 5, which is a schematic flow diagram of S5 in the method for detecting pedestrian based on 3D point clouds provided by an embodiment of the present application. The step of S5 comprises steps of S51~S52, specifically as follows:

S51: dividing the plurality of 3D voxel grid cells respectively according to a predetermined window to obtain a plurality of 3D sub-voxel grid cells corresponding to the plurality of 3D voxel grid cells and obtaining voxel encoded data of the plurality of radar point cloud data corresponding to the plurality of 3D sub-voxel grid cells.

In order to avoid global self-attention calculation, more detailed information is retained to improve the accuracy as well as the efficiency of pedestrian detection. In this embodiment, the processor divides the plurality of 3D voxel grid cells respectively according to a predetermined window, obtains a plurality of 3D sub-voxel grid cells corresponding to the plurality of 3D voxel grid cells, and obtains the voxel encoded data of the plurality of radar point cloud data corresponding to the plurality of 3D sub-voxel grid cells.

Specifically, the processor pre-sets a window with a window value of 30, which is larger than the size of the convolution kernel of the plurality of submanifold sparse convolutional operators in the sparse convolutional backbone network. Based on the pre-set window, the processor divides the plurality of 3D voxel grid cells respectively to obtain a plurality of 3D sub-voxel grid cells corresponding to the plurality of 3D voxel grid cells, and obtains the voxel encoded data of the plurality of radar point cloud data corresponding to the plurality of 3D sub-voxel grid cells, thus expanding the perceptual field of the plurality of radar point cloud data corresponding to the plurality of 3D sub-voxel grid cells and preserving more detailed information.

obtaining a second feature map according to the voxel encoded data of the plurality of radar point cloud data corresponding to the plurality of 3D sub-voxel grid cells and a predetermined second feature extraction algorithm, wherein the second feature extraction algorithm is:

$$F_2 = W_2(LN(MSA(LN(F_1), PE(I)) + F_1)) + b_2 + MSA(LN(F_1), PE(I)) + F_1,$$

wherein $F_1$ represents the voxel encoded data, $F_2$ represents the second feature map, MSA(□) represents a multi-headed self-attention function, LN(□) represents a layer normalization function, PE (||) represents a position encoding function, $W_2$ represents a second trainable weight parameter, $b_2$ represents a second bias parameter, and I represents coordinate data of the radar point cloud data corresponding to the plurality of 3D sub-voxel grid cells on the first feature map.

In this embodiment, based on the voxel encoded data of the plurality of radar point cloud data corresponding to the plurality of 3D sub-voxel grid cells, the processor performs self-attention calculation of the plurality of non-empty 3D sub-voxel grid cells, i.e., the 3D sub-voxel grid cell contain T radar point cloud data, to obtain the second feature map according to the predetermined second feature extraction algorithm, which improves the detail of the second feature map while keeping the resolution of the second feature map unchanged.

S6: fusing the first feature map and the second feature map to obtain a fused feature map, and inputting the fused feature map into a predetermined pedestrian detection model for pedestrian detection to obtain the pedestrian detection information for the area to be detected.

In this embodiment, the processor fuses the first feature map and the second feature map to obtain a fused feature map. Specifically, because the first feature map and the second feature map have the same resolution, the processor splices the first feature map and the second feature map in accordance with the dimension of the channel to obtain a spliced feature map, and input the spliced feature map to a predetermined convolutional network for convolution processing. The processor fills the empty 3D voxel grid cells in the first feature map and the second feature map, so as to obtain a more complete feature map, which improves the accuracy of pedestrian detection.

In this embodiment, the processor inputs the fused feature map into a predetermined pedestrian detection model for pedestrian detection to obtain the pedestrian detection information for the area to be detected.

Figure 6:
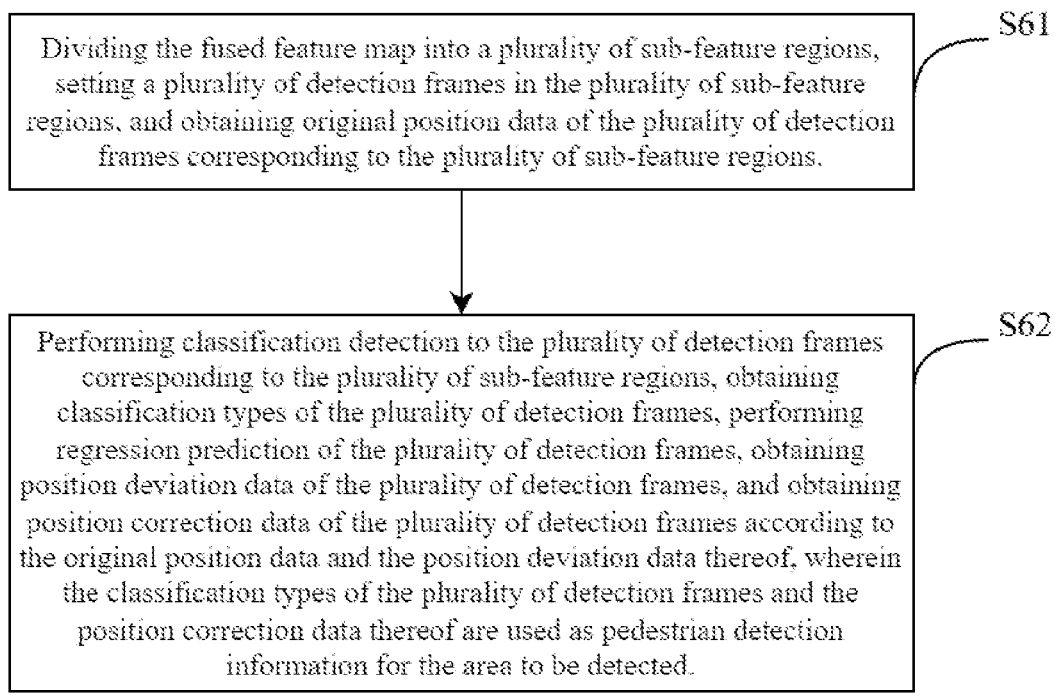
FIG. 6 is a schematic flow diagram of S5 in the method for detecting pedestrian based on 3D point clouds according to an embodiment of the present application.

Referring to FIG. 6, which is a schematic flow diagram of S6 in the method for detecting pedestrian based on 3D point clouds provided by an embodiment of the present application. The step of S6 comprises steps of S61~S62, specifically as follows:

S61: dividing the fused feature map into a plurality of sub-feature regions, setting a plurality of detection frames in the plurality of sub-feature regions, and obtaining original position data of the plurality of detection frames corresponding to the plurality of sub-feature regions.

In this embodiment, the processor divides the fused feature map into a plurality of sub-feature regions, sets a plurality of detection frames in the plurality of sub-feature regions, and obtains original position data of the plurality of detection frames corresponding to the plurality of sub-feature regions, wherein the original position data includes original center position data, original dimension data, and original heading angle data.

S62: performing classification detection to the plurality of detection frames corresponding to the plurality of sub-feature regions, obtaining classification types of the plurality of detection frames, performing regression prediction of the plurality of detection frames, obtaining position deviation data of the plurality of detection frames, and obtaining position correction data of the plurality of detection frames according to the original position data and the position deviation data thereof, wherein the classification types of the plurality of detection frames and the position correction data thereof are used as pedestrian detection information for the area to be detected.

In this embodiment, the processor performs classification detection of the plurality of detection frames corresponding to the plurality of sub-feature regions, and obtains classification types of the plurality of detection frames.

The processor performs regression prediction of the plurality of detection frames, and obtains position deviation data of the plurality of detection frames. Specifically, the processor inputs the plurality of detection frames into a predetermined 1*1 size convolution kernel for regression prediction to obtain position deviation data of the plurality of detection frames, wherein the position deviation data includes center position deviation data, dimension deviation data, and heading angle deviation data.

Based on the original position data and position deviation data of the plurality of detection frames, the processor adds the original center position data and center position deviation data, adds the original dimension data and dimension deviation data, and adds the original heading angle data and heading angle deviation data, to obtain the center position correction data, dimension correction data and heading angle correction data, which form the position correction data. And the processor takes the classification types of the plurality of detection frames and the position correction data as pedestrian detection information of the area to be detected.

Figure 7:
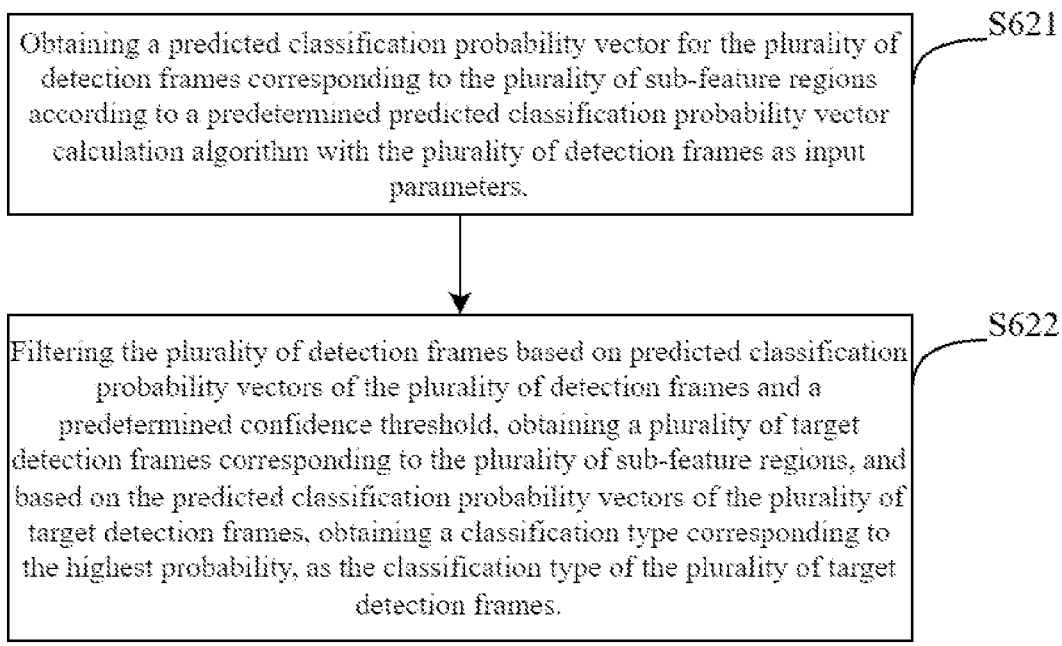
FIG. 7 is a schematic flow diagram of S51 in the method for detecting pedestrian based on 3D point clouds according to an embodiment of the present application.

Referring to FIG. 7, which is a schematic flow diagram of S62 in the method for detecting pedestrian based on 3D point clouds provided by an embodiment of the present application. The step of S62 comprises steps of S621~S622, specifically as follows:

S621: obtaining a predicted classification probability vector for the plurality of detection frames corresponding to the plurality of sub-feature regions according to a predetermined predicted classification probability vector calculation algorithm with the plurality of detection frames as input parameters, wherein the predetermined predicted classification probability vector calculation algorithm is $$Y=\text{sigmoid}(W_3X+b_3),$$

wherein, Y represents the predicted classification probability vector, X represents the input parameters, sigmoid( ) represents an activation function, $W_3$ represents a third trainable weight parameter, and $b_3$ represents a third bias parameter.

In this embodiment, the processor uses the plurality of detection frames which are preset at various positions in the fused feature map as input parameters to obtain the predicted classification probability vector for the plurality of detection frames corresponding to the plurality of sub-feature regions according to the predetermined predicted classification probability vector calculation algorithm.

S622: filtering the plurality of detection frames based on predicted classification probability vectors of the plurality of detection frames and a predetermined confidence threshold, obtaining a plurality of target detection frames corresponding to the plurality of sub-feature regions, and based on the predicted classification probability vectors of the plurality of target detection frames, obtaining a classification type corresponding to the highest probability, as the classification type of the plurality of target detection frames.

In this embodiment, the processor filters the plurality of detection frames corresponding to the plurality of sub-feature regions based on the predicted classification probability vectors of the plurality of detection frames and the predetermined confidence threshold to obtain the plurality of target detection frames corresponding to the plurality of sub-feature regions. Specifically, when the predicted classification probability vector of the plurality of detection frames corresponding to the plurality of sub-feature regions is greater than the predetermined confidence threshold, the processor set the detection frame as a target detection frame.

Based on the predicted classification probability vector of the plurality of target detection frames, the classification type corresponding to the highest probability is used as the classification type of the plurality of target detection frames corresponding to the plurality of sub-feature regions. Specifically, when Y=[Y1, Y2]=[0.1, 0.5] is calculated, wherein Y1 represents the predicted classification probability vector corresponding to the pedestrian detection type, and Y2 represents the predicted classification probability vector corresponding to the non-pedestrian detection type, with the probability maximum being Y2, the classification type of the detection frame corresponding to that position is the non-pedestrian detection type, thus serving as the classification type of the plurality of target detection frames corresponding to the plurality of sub-feature regions.

In an optional embodiment, the method for detecting pedestrian based on 3D point clouds provided by the present application further includes training the pedestrian detection model, specifically as follows:

Firstly, the processor obtains the spatial radar point cloud data of the sample area and the pedestrian detection model to be trained, and takes the spatial radar point cloud data of the sample area as training data of the pedestrian detection model. In order to enhance the robustness of the pedestrian detection model, the processor performs data enhancement processing on the training data, i.e., the spatial radar point cloud data of the sample area. Specifically, the processor performs target sampling processing on a plurality of radar point cloud data in the training data, and then performs noise addition processing, rotation processing, and disorder processing on the plurality of radar point cloud data to increase the sample size of the training data.

Secondly, the processor obtains the first feature map and the second feature map of the sample region based on the sparse convolutional backbone network and the self-attention transform network. The processor performs fusion processing to the first feature map and the second feature map, to obtain the fused feature data of the sample region. The processor inputs the fused feature data of the sample region to the pedestrian detection model to be trained, and obtains predicted classification probability vectors for the plurality of detection frames corresponding to the plurality of sub-feature regions of the sample region.

Then, the processor obtains the true classification probability vectors for the plurality of detection frames, calculates the first loss value of the pedestrian detection model to be trained based on the true classification probability vectors as well as the predicted classification probability vectors.

And the processor obtains original position data and position correction data for the plurality of detection frames, and calculates a second loss value for the pedestrian detection model to be trained based on the original position data and position correction data.

Finally, the processor optimizes the training of the pedestrian detection model to be trained according to the first loss value and the second loss value to obtain the pedestrian detection model that is well trained.

Figure 8:
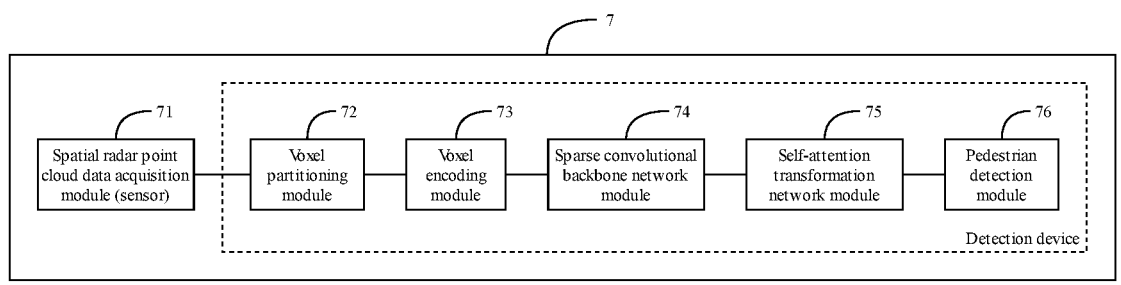
FIG. 8 is a schematic structural view of a device for detecting pedestrians based on 3D point clouds according to an embodiment of the present application.

Referring to FIG. 8 which is a schematic structural view of a device for detecting pedestrians based on 3D point clouds provided by an embodiment of the present application. The device can implement all or part of the method for detecting pedestrian described above through software, hardware or a combination thereof, including:

A spatial radar point cloud data acquisition module 71, configured to obtain spatial radar point cloud data of area to be detected, wherein the spatial radar point cloud data includes a plurality of radar point cloud data. The spatial radar point cloud data acquisition module is a sensor, which specifically can be a Lidar or camera.

A processor, and a plurality of modules executed by the processor, the plurality of modules include:

A voxel partitioning module 72, configured to divide the spatial radar point cloud data to obtain a plurality of 3D voxel grid cells according to a preset unit of voxel, wherein the plurality of 3D voxel grid cells comprises a plurality of radar point cloud data;

A voxel encoding module 73, configured to encode the plurality of 3D voxel grid cells and obtain the voxel encoded data of the plurality of radar point cloud data corresponding to the plurality of 3D voxel grid cells;

A sparse convolutional backbone network module 74, configured to input the voxel encoded data of the plurality of radar point cloud data corresponding to the plurality of 3D voxel grid cells into a predetermined sparse convolutional backbone network for feature extraction to obtain a first feature map;

A self-attention transformation network module 75, configured to divide the plurality of 3D voxel grid cells respectively according to a predetermined window to obtain a plurality of 3D sub-voxel grid cells corresponding to the plurality of 3D voxel grid cells and to obtain voxel encoded data of the plurality of radar point cloud data corresponding to the plurality of 3D sub-voxel grid cells;

A pedestrian detection module 76, configured to fuse the first feature map and the second feature map to obtain a fused feature map, and to input the fused feature map into a predetermined pedestrian detection model for pedestrian detection to obtain the pedestrian detection information for the area to be detected.

In an embodiment of the present application, the space radar point cloud data of the area to be detected is obtained through the space radar point cloud data acquisition module, wherein the space radar point cloud data includes a plurality of radar point cloud data; the spatial radar point cloud data is partitioned through the voxel partitioning module to obtain a plurality of 3D voxel grid cells according to the preset unit of voxel, wherein the plurality of 3D voxel grid cells includes a plurality of radar point cloud data; the plurality of 3D voxel grid cells are encoded by the the voxel encoding module to obtain the voxel encoded data of the plurality of radar point cloud data corresponding to the plurality of 3D voxel grid cells; the voxel encoded data are input into the predetermined sparse convolutional backbone network by the sparse convolutional backbone network module for feature extraction to obtain a first feature map; the voxel encoded data are input into the predetermined self-attention transformation network by the self-attention transformation network module for feature extraction to obtain a second feature map; the first feature map and the second feature map are fused by the pedestrian detection module to obtain a fused feature map, which is input into the predetermined pedestrian detection model for pedestrian detection to obtain the pedestrian detection information for the area to be detected.

Through sparse convolutional backbone network and self-attentive transform network, feature data maps of different perceptual fields are obtained while the sparsity of features and the resolution of feature maps are maintained during feature extraction, so that the features of small objects such as pedestrians can be better retained in feature extraction and processed for fused feature to detect pedestrians, thus enabling pedestrian detection for the area to be detected more comprehensive and accurate.

Figure 9:
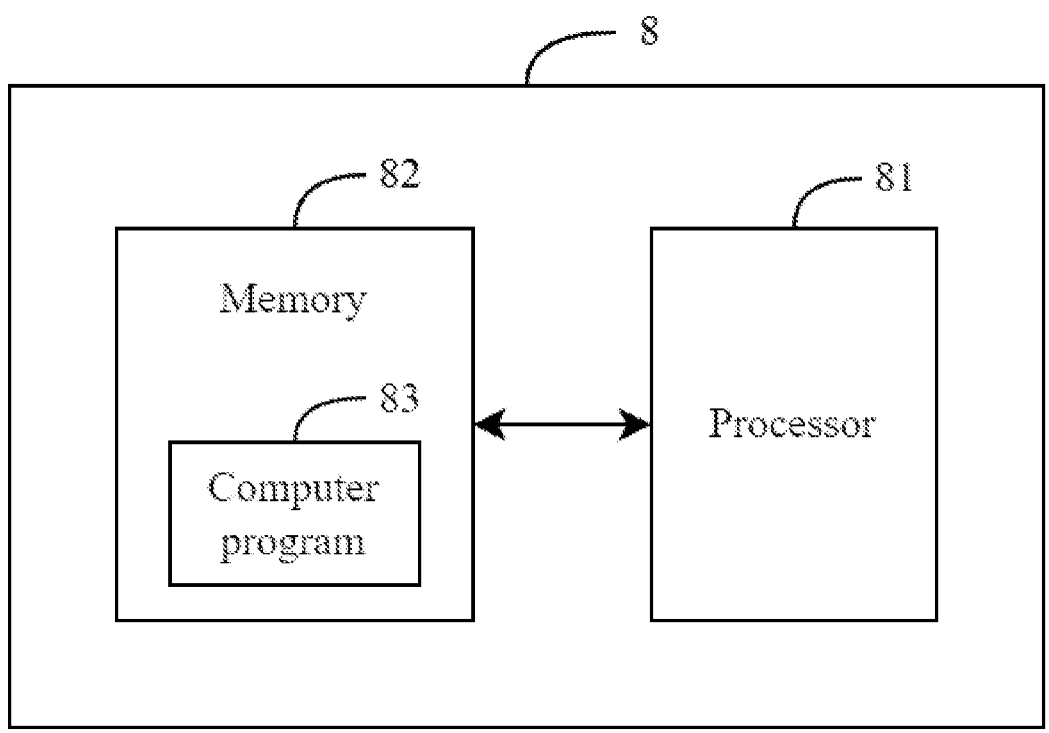
FIG. 9 is a schematic structural view of a computer system according to an embodiment of the present application.

Referring to FIG. 9, which is a schematic structural view of a computer system 8 provided by an embodiment of the present application, the computer system 8 includes: a processor 81, a memory 82, and a computer program 83 stored on the memory 82 and executable on the processor 81; the computer system may store a plurality of instructions suitable for being loaded by the processor 81 to accomplish the steps of the methods of the embodiments shown in FIGS. 1 to 6 above. For specific execution process, please refer to the specific description of the embodiments, which will not be repeated herein.

Therein, the processor 81 may include one or more processing cores. The processor 81 uses various interfaces and buses to connect various parts within the computer system to perform various functions and data processing of the pedestrian processor 7 by executing instructions, programs, code sets, or instruction sets stored in the memory 82, and by reading data in the memory 82. Optionally, the processor 81 may be implemented at least by one of Digital Signal Processing (DSP), Field-Programmable Gate Array (FPGA) or Programble Logic Array (PLA). The processor 81 may integrate one or more of a Central Processing Unit (CPU), a Graphics Processing Unit (GPU), a modem, and the like. Among them, the CPU mainly processes an operating system, user interface and application programs, etc.; the GPU is used for rendering and drawing the content that needs to be displayed on a touch screen; the modem is used for processing wireless communication. It will be appreciated that the above modem may not be integrated into the processor 81, but may be realized by a single chip.

The memory 82 may include a random memory 82 (Random Access Memory, RAM), or may include a read-only memory 82 (Read-Only Memory). Optionally, the memory 82 includes a non-transitory computer-readable storage medium. The memory 82 may be used to store instructions, programs, codes, code sets, or instruction sets. The memory 82 may include a stored program area and a stored data area, wherein the stored program area may store instructions for implementing an operating system, instructions for at least one function (e.g., touch instructions, etc.), instructions for implementing each of the method described in above embodiments, etc; the stored data area may store data involved in each of the method described in above embodiments, etc. Optionally, the memory 82 may also be at least one storage device located away from the aforementioned processor 81.

A storage medium is also provided by embodiments of the present application. The storage medium may store a plurality of instructions, which are suitable for being loaded by a processor to implement steps of the methods in embodiments described above. For specific execution process, please refer to the specific description of the embodiments shown in FIGS. 2 to 7, which will not be repeated herein.

The above embodiments are only used to illustrate the implementation of the present disclosure, but not to limit it. While the present application has been described with reference to above embodiments in detail, it will be understood by those skilled in the art that various changes may be made and equivalents may be substituted for elements thereof without departing from the scope of the present disclosure.

What is claimed:

1. A method for detecting pedestrian based on 3D point clouds, comprising steps of:
    obtaining spatial radar point cloud data of area to be detected with a sensor, wherein the spatial radar point cloud data includes a plurality of radar point cloud data;
    performing following steps with a processor:
    dividing the spatial radar point cloud data to obtain a plurality of 3D voxel grid cells according to a preset unit of voxel, wherein the plurality of 3D voxel grid cells comprises a plurality of radar point cloud data;
    encoding the plurality of 3D voxel grid cells and obtaining voxel encoded data of the plurality of radar point cloud data corresponding to the plurality of 3D voxel grid cells;
    inputting the voxel encoded data of the plurality of radar point cloud data corresponding to the plurality of 3D voxel grid cells into a predetermined sparse convolutional backbone network for feature extraction to obtain a first feature map;
    dividing the plurality of 3D voxel grid cells respectively according to a predetermined window to obtain a plurality of 3D sub-voxel grid cells corresponding to the plurality of 3D voxel grid cells and obtaining voxel encoded data of the plurality of radar point cloud data corresponding to the plurality of 3D sub-voxel grid cells;
    obtaining a second feature map according to the voxel encoded data of the plurality of radar point cloud data corresponding to the plurality of 3D sub-voxel grid cells and a predetermined second feature extraction algorithm,
    wherein the second feature extraction algorithm is:

$$F_2 = W_2(\text{LN}(\text{MSA}(\text{LN}(F_1), \text{PE}(I)) + F_1)) + b_2 + \text{MSA}(\text{LN}(F_1), \text{PE}(I)) + F_1,$$

wherein $F_1$ represents the voxel encoded data, $F_2$ represents the second feature map, $\text{MSA}(\sqcup)$ represents a multi-headed self-attention function, $\text{LN}(|\ |)$ represents a layer normalization function, $\text{PE}(\square)$ represents a position encoding function, $W_2$ represents a second trainable weight parameter, $b_2$ represents a second bias parameter, and I represents coordinate data of the radar point cloud data corresponding to the plurality of 3D sub-voxel grid cells on the first feature map;
    and fusing the first feature map and the second feature map to obtain a fused feature map, and inputting the fused feature map into a predetermined pedestrian detection model for pedestrian detection to obtain the pedestrian detection information for the area to be detected.

2. The method for detecting pedestrian of claim 1, wherein the step of encoding the plurality of 3D voxel grid cells and obtaining the voxel encoded data of the plurality of radar point cloud data corresponding to the plurality of 3D voxel grid cells comprises:
    obtaining coordinate data and reflectivity data of the plurality of radar point cloud data corresponding to the plurality of 3D voxel grid cells, wherein the coordinate data comprise original coordinate data, average coordinate difference data, and central coordinate difference data;
    splicing the coordinate data and reflectivity data of the plurality of radar point cloud data corresponding to the plurality of 3D voxel grid cells, to obtain voxel spliced data of the plurality of radar point cloud data corresponding to the plurality of 3D voxel grid cells thereof; and
    processing the voxel spliced data of the plurality of radar point cloud data corresponding to the plurality of 3D voxel grid cells, to obtain the voxel encoded data thereof according to a predetermined encoding algorithm, wherein the predetermined encoding algorithm is:

$$F_1=W_1(W_0F_p+b_0)+b_1,$$

wherein, $F_1$ represents the voxel encoded data, $W_0$ represents a first trainable weight parameter, $W_1$ represents a second trainable weight parameter, $F_p$ represents the voxel spliced data, $b_0$ represents a first bias parameter, and $b_1$ represents a second bias parameter.

3. The method for detecting pedestrian of claim 2, wherein the step of obtaining coordinate data and reflectivity data of the plurality of radar point cloud data corresponding to the plurality of 3D voxel grid cells comprises:

obtaining the average coordinate data of the plurality of 3D voxel grid cells, according to predetermined average coordinate algorithms and the original coordinate data of the plurality of radar point cloud data corresponding to the plurality of 3D voxel grid cells, wherein the predetermined average coordinate algorithms are:

$$\bar{x}=\sum_{i=0}^{k}x_i,\ \bar{y}=\sum_{i=0}^{k}y_i,\ \bar{z}=\sum_{i=0}^{k}z_i,$$

wherein, k represents any of x, y, z coordinate axes, i represents the i-th radar point cloud data in the 3D voxel grid cell, $x_i$ represents the original coordinate data of the i-th radar point cloud data on the x coordinate axis, $\bar{x}$ represents the average coordinate data on the x coordinate axis, $y_i$ represents the original coordinate data of the i-th radar point cloud data on the y coordinate axis, $\bar{y}$ represents the average coordinate data on the y coordinate axis, $z_i$ represents the original coordinate data of the i-th radar point cloud data on the z coordinate axis, $\bar{z}$ represents the average coordinate data on the z coordinate axis;

obtaining the original coordinate data, length data and initial offset data of the plurality of 3D voxel grid cells and then obtaining central coordinate data thereof according to a predetermined central coordinate algorithm, wherein the predetermined central coordinate algorithm is:

$$\bar{v}_k=\text{coord}_k*v_k+\text{offset}_k,$$

wherein, $\bar{v}_k$ represents the central coordinate data of the 3D voxel grid cell on the k-th coordinate axis, $\text{coord}_k$ represents the original coordinate data of the 3D voxel grid cell on the k-th coordinate axis, $v_k$ represents the length data of the 3D voxel grid cell on the k-th coordinate axis, $\text{offset}_k$ represents the initial offset data of the 3D voxel grid cell on the k-th coordinate axis;

and obtaining average coordinate difference data and the central coordinate difference data of the plurality of radar point cloud data corresponding to the plurality of 3D voxel grid cells, according to the original coordinate data of the plurality of radar point cloud data corresponding to the plurality of 3D voxel grid cells, the average coordinate data and the central coordinate data of the plurality of 3D voxel grid cells.

4. The method for detecting pedestrian of claim 1, wherein the step of inputting the fused feature map into a predetermined pedestrian detection model for pedestrian detection to obtain the pedestrian detection information for the area to be detected comprises:

dividing the fused feature map into a plurality of sub-feature regions, setting a plurality of detection frames in the plurality of sub-feature regions, and obtaining original position data of the plurality of detection frames corresponding to the plurality of sub-feature regions;

and performing classification detection to the plurality of detection frames corresponding to the plurality of sub-feature regions, obtaining classification types of the plurality of detection frames, performing regression prediction of the plurality of detection frames, obtaining position deviation data of the plurality of detection frames, and obtaining position correction data of the plurality of detection frames according to the original position data and the position deviation data thereof, wherein the classification types of the plurality of detection frames and the position correction data thereof are used as pedestrian detection information for the area to be detected.

5. The method for detecting pedestrian of claim 4, wherein the step of performing classification detection to the plurality of detection frames corresponding to the plurality of sub-feature regions to obtain classification types comprises:

obtaining a predicted classification probability vector for the plurality of detection frames corresponding to the plurality of sub-feature regions according to a predetermined predicted classification probability vector calculation algorithm with the plurality of detection frames as input parameters, wherein the predetermined predicted classification probability vector calculation algorithm is $$Y=\text{sigmoid}(W_3X+b_3),$$

wherein, Y represents the predicted classification probability vector, X represents the input parameters, sigmoid( ) represents an activation function, $W_3$ represents a third trainable weight parameter, and $b_3$ represents a third bias parameter;

and filtering the plurality of detection frames based on predicted classification probability vectors of the plurality of detection frames and a predetermined confidence threshold, obtaining a plurality of target detection frames corresponding to the plurality of sub-feature regions, and based on the predicted classification probability vectors of the plurality of target detection frames, obtaining a classification type corresponding to the highest probability, as the classification type of the plurality of target detection frames.

6. A device for detecting pedestrians based on 3D point clouds, comprising:

a sensor configured to obtain spatial radar point cloud data of area to be detected, wherein the spatial radar point cloud data includes a plurality of radar point cloud data;

a processor, and a plurality of modules executed by the processor, the plurality of modules comprising:

a voxel partitioning module, configured to divide the spatial radar point cloud data to obtain a plurality of 3D voxel grid cells according to a preset unit of voxel, wherein the plurality of 3D voxel grid cells comprises a plurality of radar point cloud data;

a voxel encoding module, configured to encode the plurality of 3D voxel grid cells and obtain the voxel encoded data of the plurality of radar point cloud data corresponding to the plurality of 3D voxel grid cells;

a sparse convolutional backbone network module, configured to input the voxel encoded data of the plurality of radar point cloud data corresponding to the plurality of 3D voxel grid cells into a predetermined sparse convolutional backbone network for feature extraction to obtain a first feature map;

a self-attention transformation network module, configured to divide the plurality of 3D voxel grid cells respectively according to a predetermined window to obtain a plurality of 3D sub-voxel grid cells corresponding to the plurality of 3D voxel grid cells and to obtain voxel encoded data of the plurality of radar point cloud data corresponding to the plurality of 3D sub-voxel grid cells; and to obtain a second feature map according to the voxel encoded data of the plurality of radar point cloud data corresponding to the plurality of 3D sub-voxel grid cells and a predetermined second feature extraction algorithm, wherein the second feature extraction algorithm is:

$$F_2 = W_2(LN(MSA(LN(F_1), PE(I)) + F_1)) + b_2 + MSA(LN(F_1), PE(I)) + F_1,$$

wherein $F_1$ represents the voxel encoded data, $F_2$ represents the second feature map, $MSA(\sqcup)$ represents a multi-headed self-attention function, $LN(\square)$ represents a layer normalization function, $PE(\sqcup)$ represents a position encoding function, $W_2$ represents a second trainable weight parameter, $b_2$ represents a second bias parameter, and I represents coordinate data of the radar point cloud data corresponding to the plurality of 3D sub-voxel grid cells on the first feature map;

a pedestrian detection module, configured to fuse the first feature map and the second feature map to obtain a fused feature map, and to input the fused feature map into a predetermined pedestrian detection model for pedestrian detection to obtain the pedestrian detection information for the area to be detected.

7. The device for detecting pedestrian of claim 6, wherein the step of encoding the plurality of 3D voxel grid cells and obtaining the voxel encoded data of the plurality of radar point cloud data corresponding to the plurality of 3D voxel grid cells comprises:

obtaining coordinate data and reflectivity data of the plurality of radar point cloud data corresponding to the plurality of 3D voxel grid cells, wherein the coordinate data comprise original coordinate data, average coordinate difference data, and central coordinate difference data;

splicing the coordinate data and reflectivity data of the plurality of radar point cloud data corresponding to the plurality of 3D voxel grid cells, to obtain voxel spliced data of the plurality of radar point cloud data corresponding to the plurality of 3D voxel grid cells thereof; and processing the voxel spliced data of the plurality of radar point cloud data corresponding to the plurality of 3D voxel grid cells, to obtain the voxel encoded data thereof according to a predetermined encoding algorithm, wherein the predetermined encoding algorithm is:

$$F_1 = W_1(W_0 F_p + b_0) + b_1,$$

wherein, $F_1$ represents the voxel encoded data, $W_0$ represents a first trainable weight parameter, $W_1$ represents a second trainable weight parameter, $F_p$ represents the voxel spliced data, $b_0$ represents a first bias parameter, and $b_1$ represents a second bias parameter.

8. The device for detecting pedestrian of claim 7, wherein the step of obtaining coordinate data and reflectivity data of the plurality of radar point cloud data corresponding to the plurality of 3D voxel grid cells comprises:

obtaining the average coordinate data of the plurality of 3D voxel grid cells, according to predetermined average coordinate algorithms and the original coordinate data of the plurality of radar point cloud data corresponding to the plurality of 3D voxel grid cells, wherein the predetermined average coordinate algorithms are:

$$\bar{x} = \sum_{i=0}^{k} x_i, \; \bar{y} = \sum_{i=0}^{k} y_i, \; \bar{z} = \sum_{i=0}^{k} z_i,$$

wherein, k represents any of x, y, z coordinate axes, i represents the i-th radar point cloud data in the 3D voxel grid cell, $x_i$ represents the original coordinate data of the i-th radar point cloud data on the x coordinate axis, $\bar{x}$ represents the average coordinate data on the x coordinate axis, $y_i$ represents the original coordinate data of the i-th radar point cloud data on the y coordinate axis, $\bar{y}$ represents the average coordinate data on the y coordinate axis, $z_i$ represents the original coordinate data of the i-th radar point cloud data on the z coordinate axis, $\bar{z}$ represents the average coordinate data on the z coordinate axis;

obtaining the original coordinate data, length data and initial offset data of the plurality of 3D voxel grid cells and then obtaining central coordinate data thereof according to a predetermined central coordinate algorithm, wherein the predetermined central coordinate algorithm is:

$$\bar{v}_k = \text{coord}_k * v_k + \text{offset}_k,$$

wherein, $\bar{v}_k$ represents the central coordinate data of the 3D voxel grid cell on the k-th coordinate axis, $\text{coord}_k$ represents the original coordinate data of the 3D voxel grid cell on the k-th coordinate axis, $v_k$ represents the length data of the 3D voxel grid cell on the k-th coordinate axis, $\text{offset}_k$ represents the initial offset data of the 3D voxel grid cell on the k-th coordinate axis;

and obtaining average coordinate difference data and the central coordinate difference data of the plurality of radar point cloud data corresponding to the plurality of 3D voxel grid cells, according to the original coordinate data of the plurality of radar point cloud data corresponding to the plurality of 3D voxel grid cells, the average coordinate data and the central coordinate data of the plurality of 3D voxel grid cells.

9. The device for detecting pedestrian of claim 7, wherein the step of inputting the fused feature map into a predetermined pedestrian detection model for pedestrian detection to obtain the pedestrian detection information for the area to be detected comprises:

dividing the fused feature map into a plurality of sub-feature regions, setting a plurality of detection frames in the plurality of sub-feature regions, and obtaining original position data of the plurality of detection frames corresponding to the plurality of sub-feature regions;

and performing classification detection to the plurality of detection frames corresponding to the plurality of sub-feature regions, obtaining classification types of the plurality of detection frames, performing regression prediction of the plurality of detection frames, obtaining position deviation data of the plurality of detection frames, and obtaining position correction data of the plurality of detection frames according to the original position data and the position deviation data thereof, wherein the classification types of the plurality of detection frames and the position correction data thereof are used as pedestrian detection information for the area to be detected.

10. The device for detecting pedestrian of claim 9, wherein the step of performing classification detection to the plurality of detection frames corresponding to the plurality of sub-feature regions to obtain classification types comprises:

obtaining a predicted classification probability vector for the plurality of detection frames corresponding to the plurality of sub-feature regions according to a predetermined predicted classification probability vector calculation algorithm with the plurality of detection frames as input parameters, wherein the predetermined predicted classification probability vector calculation algorithm is $$Y = \mathrm{sigmoid}(W_3 X + b_3),$$

wherein, Y represents the predicted classification probability vector, X represents the input parameters, sigmoid( ) represents an activation function, $W_3$ represents a third trainable weight parameter, and $b_3$ represents a third bias parameter;

and filtering the plurality of detection frames based on predicted classification probability vectors of the plurality of detection frames and a predetermined confidence threshold, obtaining a plurality of target detection frames corresponding to the plurality of sub-feature regions, and based on the predicted classification probability vectors of the plurality of target detection frames, obtaining a classification type corresponding to the highest probability, as the classification type of the plurality of target detection frames.

11. A computer system for detecting pedestrian, comprising:
a processor;
a memory; and
a computer program stored in the memory and executable by the processor, wherein the processor executes the computer program to implement the steps of the method for detecting pedestrian of claim 1.

12. The computer system for detecting pedestrian of claim 11, wherein the method that is implemented by the processor comprises:

wherein the step of encoding the plurality of 3D voxel grid cells and obtaining the voxel encoded data of the plurality of radar point cloud data corresponding to the plurality of 3D voxel grid cells comprises:

obtaining coordinate data and reflectivity data of the plurality of radar point cloud data corresponding to the plurality of 3D voxel grid cells, wherein the coordinate data comprise original coordinate data, average coordinate difference data, and central coordinate difference data;

splicing the coordinate data and reflectivity data of the plurality of radar point cloud data corresponding to the plurality of 3D voxel grid cells, to obtain voxel spliced data of the plurality of radar point cloud data corresponding to the plurality of 3D voxel grid cells thereof; and processing the voxel spliced data of the plurality of radar point cloud data corresponding to the plurality of 3D voxel grid cells, to obtain the voxel encoded data thereof according to a predetermined encoding algorithm, wherein the predetermined encoding algorithm is:

$$F_1 = W_1(W_0 F_p + b_0) + b_1,$$

wherein, $F_1$ represents the voxel encoded data, $W_0$ represents a first trainable weight parameter, $W_1$ represents a second trainable weight parameter, $F_p$ represents the voxel spliced data, $b_0$ represents a first bias parameter, and $b_1$ represents a second bias parameter.

13. The computer system for detecting pedestrian of claim 12, wherein the method that is implemented by the processor comprises:

wherein the step of obtaining coordinate data and reflectivity data of the plurality of radar point cloud data corresponding to the plurality of 3D voxel grid cells comprises:

obtaining the average coordinate data of the plurality of 3D voxel grid cells, according to predetermined average coordinate algorithms and the original coordinate data of the plurality of radar point cloud data corresponding to the plurality of 3D voxel grid cells, wherein the predetermined average coordinate algorithms are:

$$\bar{x} = \sum_{i=0}^{k} x_i,\ \bar{y} = \sum_{i=0}^{k} y_i,\ \bar{z} = \sum_{i=0}^{k} z_i,$$

wherein, k represents any of x, y, z coordinate axes, i represents the i-th radar point cloud data in the 3D voxel grid cell, $x_i$ represents the original coordinate data of the i-th radar point cloud data on the x coordinate axis, $\bar{x}$ represents the average coordinate data on the x coordinate axis, $y_i$ represents the original coordinate data of the i-th radar point cloud data on the y coordinate axis, $\bar{y}$ represents the average coordinate data on the y coordinate axis, $z_i$ represents the original coordinate data of the i-th radar point cloud data on the z coordinate axis, $\bar{z}$ represents the average coordinate data on the z coordinate axis;

obtaining the original coordinate data, length data and initial offset data of the plurality of 3D voxel grid cells and then obtaining central coordinate data thereof according to a predetermined central coordinate algorithm, wherein the predetermined central coordinate algorithm is:

$$\bar{v}_k = \mathrm{coord}_k * v_k + \mathrm{offset}_k,$$

wherein, $\bar{v}_k$ represents the central coordinate data of the 3D voxel grid cell on the k-th coordinate axis, $\mathrm{coord}_k$ represents the original coordinate data of the 3D voxel grid cell on the k-th coordinate axis, $v_k$ represents the length data of the 3D voxel grid cell on the k-th coordinate axis, $\mathrm{offset}_k$ represents the initial offset data of the 3D voxel grid cell on the k-th coordinate axis;

and obtaining average coordinate difference data and the central coordinate difference data of the plurality of radar point cloud data corresponding to the plurality of 3D voxel grid cells, according to the original coordinate data of the plurality of radar point cloud data corresponding to the plurality of 3D voxel grid cells, the average coordinate data and the central coordinate data of the plurality of 3D voxel grid cells.

14. The computer system for detecting pedestrian of claim 11, wherein the method that is implemented by the processor comprises:
- wherein the step of inputting the fused feature map into a predetermined pedestrian detection model for pedestrian detection to obtain the pedestrian detection information for the area to be detected comprises:
- dividing the fused feature map into a plurality of sub-feature regions, setting a plurality of detection frames in the plurality of sub-feature regions, and obtaining original position data of the plurality of detection frames corresponding to the plurality of sub-feature regions;
- and performing classification detection to the plurality of detection frames corresponding to the plurality of sub-feature regions, obtaining classification types of the plurality of detection frames, performing regression prediction of the plurality of detection frames, obtaining position deviation data of the plurality of detection frames, and obtaining position correction data of the plurality of detection frames according to the original position data and the position deviation data thereof, wherein the classification types of the plurality of detection frames and the position correction data thereof are used as pedestrian detection information for the area to be detected.

15. The computer system for detecting pedestrian of claim 14, wherein the method that is implemented by the processor comprises:
- wherein the step of performing classification detection to the plurality of detection frames corresponding to the plurality of sub-feature regions to obtain classification types comprises:
- obtaining a predicted classification probability vector for the plurality of detection frames corresponding to the plurality of sub-feature regions according to a predetermined predicted classification probability vector calculation algorithm with the plurality of detection frames as input parameters, wherein the predetermined predicted classification probability vector calculation algorithm is $Y=\text{sigmoid}(W_3 X + b_3)$, wherein, Y represents the predicted classification probability vector, X represents the input parameters, sigmoid( ) represents an activation function, $W_3$ represents a third trainable weight parameter, and $b_3$ represents a third bias parameter;

and filtering the plurality of detection frames based on predicted classification probability vectors of the plurality of detection frames and a predetermined confidence threshold, obtaining a plurality of target detection frames corresponding to the plurality of sub-feature regions, and based on the predicted classification probability vectors of the plurality of target detection frames, obtaining a classification type corresponding to the highest probability, as the classification type of the plurality of target detection frames.

* * * * *